US006827677B2

(12) United States Patent
Glöckner et al.

(10) Patent No.: US 6,827,677 B2
(45) **Date of Patent: *Dec. 7, 2004**

(54) ROLLERS OR CYLINDERS WITH A METALLIC FOAM CORE

(75) Inventors: Erhard Herbert Glöckner, Eibelstadt (DE); Willi Albert Peter Kutzner, Würzburg (DE); Wolfgang Günter Ruckmann, Wüzburg (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/299,786

(22) Filed: Nov. 20, 2002

(65) Prior Publication Data

US 2003/0056372 A1 Mar. 27, 2003

Related U.S. Application Data

(62) Division of application No. 09/529,408, filed as application No. PCT/DE98/03200 on Nov. 3, 1998, now Pat. No. 6,484,402.

(30) Foreign Application Priority Data

Nov. 7, 1997 (DE) .......................................... 19749228

(51) Int. Cl.[7] ................................................ B23P 15/00

(52) U.S. Cl. ............................ 492/57; 492/21; 492/47; 29/895.21

(58) Field of Search ............................. 492/57, 21, 47, 492/59; 29/895.2, 895.21, 428

(56) References Cited

U.S. PATENT DOCUMENTS

| | | | |
|---|---|---|---|
| 3,830,288 | A | 8/1974 | Laing |
| 3,902,845 | A | 9/1975 | Murphy |
| 4,142,338 | A | 3/1979 | Becker |
| 4,428,290 | A | 1/1984 | Junghans et al. |
| 4,852,230 | A | 8/1989 | Yu |
| 5,206,992 | A | 5/1993 | Carlson et al. |
| 5,609,554 | A | 3/1997 | Hayashi et al. |
| 5,786,051 | A | 7/1998 | Niggemeier et al. |
| 5,836,499 | A | 11/1998 | Mullet et al. |

FOREIGN PATENT DOCUMENTS

| | | | |
|---|---|---|---|
| DE | 41 19 825 | C1 | 12/1992 |
| DE | 295 14 164.6 | | 1/1997 |
| DE | 195 45 597 | A1 | 6/1997 |
| JP | 55-068161 | | 5/1980 |
| JP | 61-16364 | | 1/1986 |
| JP | 63193863 | A | 8/1988 |
| JP | 3-50446 | | 5/1991 |
| JP | 5-247502 | | 9/1993 |
| JP | 6-87717 | | 12/1994 |
| JP | 7-238923 | | 9/1995 |

OTHER PUBLICATIONS

English Translation of DE 44 26 627 A1.

*Primary Examiner*—I Cuda Rosenbaum
(74) *Attorney, Agent, or Firm*—Jones, Tullar & Cooper PC

(57) ABSTRACT

Rollers and cylinders that are useable in a rotary printing presses are made using hollow tubular casings having metallic foam cores. The casings and cores are made separately. The cores are then placed inside the casing and the two are secured in a force-transmitting manner.

1 Claim, No Drawings

ROLLERS OR CYLINDERS WITH A METALLIC FOAM CORE

"This application is a divisional of application Ser. No. 09/529,408 filed on Apr. 27, 2000 now U.S. Pat. No. 6,484,402 which is a 371 of PCT/DE98/03200 filed Nov. 3, 1998.

FIELD OF THE INVENTION

The present invention is directed to rollers or cylinders with a metallic foam core, and to a process for producing these rollers or cylinders.

DESCRIPTION OF THE PRIOR ART

Processes for producing a metallic foam have become known from U.S. Pat. No. 3,087,807 A and DE 40 18 360 C1. U.S. Pat. No. 3,087,807 A discloses that a hollow body can be filled with a metallic foam by generating the metallic foam inside the hollow body.

DE 44 43 840 C2 shows an impact protector for a motor vehicle paneling element. In this case, a cushion made of a light metal foam is completely enclosed in a casing. This document does not show whether or how the light metal foam may be fastened in the interior of the casing.

A way of producing plates in sandwich construction can be taken from DE-OS 21 19 490. Metallic foam plates arranged between cover plates are used. The cover plates are fastened on the metallic foam plate.

Rotating cylinders which are useable, for example, in the form of paper guide rollers, or hollow cylinders which are useable, for example, as printing cylinders or as rubber blanket cylinders, are known in connection with rotary printing presses, for example. Paper guide rollers, for example, are driven by the web itself, which is to be guided by them. This can result in an unintended effect imparted to the print carrier web, which web may be, for example, a paper web or a foil web since, as stated, the energy for accelerating or braking the cylinders or rollers must be applied to the cylinders or rollers themselves via the print carrier web. Added to this are the difficulties that result because, on the one hand, the paper web widths continue to become greater (for example 3.80 m) and, on the other hand, the speeds of the print carrier webs are also continuously increased and have currently reached 18 m/sec.

SUMMARY OF THE INVENTION

It is the object of the present invention to provide rollers and cylinders with metallic foam cores for use as rollers and cylinders intended for rotating operation, and to provide a process for producing these rollers and cylinders.

In accordance with the present invention, this object is attained by the production of a metallic foam core separate from a roller or cylinder which has a hollow casing. The separately formed metallic foam core is inserted into the interior of the hollow casing and is fastened, in a force-transmitting manner, to the interior surface of the casing.

The advantages to be gained by the present invention reside, in particular, in that rollers, cylinders, or the like, which are suitable for rotary operations at high speeds of revolutions, and having a metallic foam core, can be created. These rollers or cylinders have a casing which is not stressed by the high temperatures, for example in the area of 500 C required for creating a metallic foam. It is possible to join different metals, for example to join rollers made of steel with an aluminum foam, so that there is no relative movement between the interior surface of the roller and the metallic foam surface occurring in the course of rotary operations of the rollers or cylinders during acceleration and braking. It is therefore possible to utilize all of the advantages provided by filling the rollers or cylinders with a metallic foam, without it being necessary to overstress the rollers or cylinders thermally.

Thus it is possible, for example, to omit an individual electric motor drive, for example, for the paper guide rollers.

DESCRIPTION OF THE PREFERRED EMBODIMENTS

Preferred embodiments of the rollers or cylinders with a metallic foam core of the present invention and the process for producing the same will be described in what follows:

It is common to all of the processes in accordance with the present invention that a metallic foam core is inserted into a tube-shaped body, open at one or both ends, of any arbitrary cross section, for example a roller or a cylinder.

The tube-shaped body, which will be called a casing in what follows, can be made of any suitable material. For example, the casing may be made of metal such as steel, aluminum, brass, or the like. The casing may also be made of a plastic material, for example polyamide, of a ceramic material or it may be made of paper. The cross section of the casing's hollow interior can have any desired geometric shape such as circular, square, with single or multiple longitudinal grooves, or as a counterpart of a splined shaft with either a single spline, or with multiple splines, as a serrated shaft, a K-profile shaft, or the like.

Thus, the cross section of the interior of the casing can have a variety of shapes. However, it must be configured in such a way that it is possible to introduce one or several metallic foam cores through one of the openings at the ends of the rollers or cylinders or, when using multi-part metallic foam cores, from both end openings.

The metallic foam core is produced at a location separate from the casing and is later introduced into the interior of the casing.

The metallic foam core can be produced in several ways, which are known per se, for example in accordance with the processes described in DE 40 18 360 C1. In accordance with the processes of the present invention, foaming of the metallic foam core takes place outside of the casing to be filled.

In accordance with the present invention, the metallic foam core is introduced, in a quasi-finished state, into the interior of the casing and is fastened, either on the entire interior surface of the casing, or only on portions of the interior surface of the casing. The connection between the outer surface of the metallic foam core and the interior surface of the hollow casing must be designed such that it allows, at least partially, a force transfer between the interior surface of the hollow casing and the exterior surface of the metallic foam core.

The connection can be formed as a releasable connection or as a non-releasable connection.

Releasable connections can be interlocking connections, for example profiled connections or spring connections. Screw connections, are also suitable. In the above-mentioned cases, it is necessary to match the inner surfaces of the casing and the outer surface of the metallic foam core to each other, for example by providing interior threads in the casing and corresponding exterior threads on the metallic foam core; by providing the surface of the metallic foam core with a taper key, or as a "multi-splined shaft", and the interior surface of the casing with a corresponding groove or grooves. Frictional connections in the form of a cone connection with, for example an outer cone on the metallic foam core and an, inner cone on the casing would also be possible.

Releasable connections can also be force-locking in that a shrinkage fit is used in addition to the above-described releasable connections. To this end, when using metallic casings, the casing is heated and the metallic foam core is inserted into the interior of the casing. The metallic foam core can additionally be cooled. A very solid, interlocking and force-locking connection is formed between the casing and core after temperature equalization occurs.

The connection between the hollow casing and the metallic foam core can be provided as a connection directly between the materials involved, for example as an adhesive connection, or as a force-locking connection, for example a shrinkage fit. The connection between the casing and the core can also be formed as a combined material and force-locking connection. In the latter case, a casing, which for example has been heated, is pushed onto and over a metallic foam core that is preferably cooled and that has been coated with an adhesive, for example a metallic adhesive based on a dimethylacrylate ester, for example LOCTITE 574, a product of the LOCTITE company. In this case, the casing is made of steel, for example, and the metallic foam is an aluminum foam, for example. A very solid shrinkage and adhesive connection occurs after cooling of the casing and curing of the adhesive. Anaerobic adhesives are particularly suited here, which make possible the connection between different metals in a simple manner.

It must be assured in connection with all of the above described types of force transferring or force transmitting connections that there is no possible play between the casing and the metallic foam core, or that such play could occur.

While preferred embodiments of rollers or cylinders with metallic foam cores, and their methods of production, in accordance with the present invention have been set forth fully and completely hereinabove, it will be apparent to one of skill in the art that a number of changes in, for example the overall sizes of the rollers or cylinders, the types of printing presses in which they can be used, and the like can be made without departing from the true spirit and scope of the present invention which is accordingly to be limited only by the following claims.

What is claimed is:

1. A roller or cylinder consisting of:

a hollow tube-shaped casing having a hollow casing interior surface with an interior surface shape;

a metallic foam core formed separate from said hollow casing and inserted into said hollow casing, said metallic foam core completely filling said hollow casing, said metallic foam core having a core outer surface, said metallic foam core outer surface having a shape complementary to said hollow casing interior surface shape, said metallic foam core outer surface and said hollow casing inner surface being in contact in their entireties with each other when said metallic foam core is positioned in said hollow casing; and a force transmitting connection between said hollow casing interior surface and said metallic foam core outer surface when said metallic foam core is positioned in said hollow casing, said force transmitting connection preventing movement between said hollow casing and said metallic foam core.

* * * * *